(12) United States Patent
Noiseux et al.

(10) Patent No.: US 8,869,463 B2
(45) Date of Patent: Oct. 28, 2014

(54) MOBILE SERVICE STATION AND METHOD OF CONFIGURING THE SAME

(75) Inventors: Daniel Noiseux, Ville Mont-Royal (CA); Pierre Maheu, Montréal (CA); François Lampron, Montréal (CA); Joseph Lacerte, Montréal (CA); Alain Neveu, Chertsey (CA)

(73) Assignee: 6943977 Canada Inc., Montreal, Quebec (CA)

( * ) Notice: Subject to any disclaimer, the term of this patent is extended or adjusted under 35 U.S.C. 154(b) by 0 days.

(21) Appl. No.: 12/786,901

(22) Filed: May 25, 2010

(65) Prior Publication Data

US 2011/0094167 A1  Apr. 28, 2011

(30) Foreign Application Priority Data

May 25, 2009  (CA) ..................................... 2666863

(51) Int. Cl.
| | |
|---|---|
| *E04H 1/12* | (2006.01) |
| *E04B 1/343* | (2006.01) |
| *E04B 1/344* | (2006.01) |
| *A47F 3/00* | (2006.01) |
| *A47F 9/00* | (2006.01) |

(52) U.S. Cl.
CPC .............. *A47F 3/004* (2013.01); *E04H 1/1222* (2013.01); *E04B 1/3444* (2013.01); *E04H 2001/1283* (2013.01); *A47F 9/00* (2013.01)
USPC .......... 52/79.5; 52/36.1; 52/64; 52/68; 52/69; 52/143; 52/745.02; 52/745.2

(58) Field of Classification Search
USPC ........... 52/36.1, 36.2, 64, 68, 79.5, 79.6, 143, 52/745.02, 745.2, 69; 296/22
See application file for complete search history.

(56) References Cited

U.S. PATENT DOCUMENTS

| | | | |
|---|---|---|---|
| 458,738 A | * | 9/1891 | Palmer ........................... 296/22 |
| 3,182,424 A | | 5/1965 | Betjemann |
| 3,792,558 A | * | 2/1974 | Berce et al. .................... 52/79.7 |

(Continued)

FOREIGN PATENT DOCUMENTS

CA           2704886 A1  * 11/2010

OTHER PUBLICATIONS

MUVBOX: The Information Booklet, publicly available on Dec. 2, 2009 (5 pages).*

(Continued)

*Primary Examiner* — Basil Katcheves
*Assistant Examiner* — Rodney Mintz
(74) *Attorney, Agent, or Firm* — Merchant & Gould P.C.

(57) ABSTRACT

A mobile service station includes a deployable structure configurable between a first closed configuration wherein the structure is a container having two side walls, a roof, a floor, a front wall and a rear wall, and a second deployed configuration as an operating service station. The station includes service station accessories mounted on at least one of the side walls. At least one side wall of the structure is foldable between a first vertical position, wherein the side wall acts as a vertical side wall for the closed configuration, and a second position wherein the side wall acts as additional floor space for the structure in the deployed configuration. The service station is adaptable for use as a high-end food stand, among other applications. A method configures the mobile service station.

4 Claims, 11 Drawing Sheets

(56) References Cited

U.S. PATENT DOCUMENTS

| | | | | |
|---|---|---|---|---|
| 4,135,755 A * | 1/1979 | Steffens | ................... | 296/26.15 |
| 4,535,933 A * | 8/1985 | Kuiper | ................... | 237/12.3 A |
| 4,601,509 A * | 7/1986 | Ellis, Sr. | ................... | 296/22 |
| 5,237,784 A * | 8/1993 | Ros | ................... | 52/79.5 |
| 5,285,604 A * | 2/1994 | Carlin | ................... | 52/79.1 |
| 5,375,899 A * | 12/1994 | Wright | ................... | 296/21 |
| 5,493,187 A | 2/1996 | Iijima | | |
| 5,493,817 A * | 2/1996 | Speer | ................... | 52/69 |
| 5,706,616 A * | 1/1998 | Fernandez | ................... | 52/143 |
| 5,761,854 A * | 6/1998 | Johnson et al. | ................... | 52/69 |
| 5,833,295 A * | 11/1998 | Farlow, Jr. | ................... | 296/22 |
| 5,966,956 A * | 10/1999 | Morris et al. | ................... | 62/259.1 |
| 6,155,747 A * | 12/2000 | Payne et al. | ................... | 405/129.55 |
| 6,189,944 B1 * | 2/2001 | Piche | ................... | 296/22 |
| 6,205,716 B1 * | 3/2001 | Peltz | ................... | 52/36.2 |
| 6,772,563 B2 * | 8/2004 | Kuhn | ................... | 52/67 |
| 6,783,164 B2 * | 8/2004 | Bortell | ................... | 296/24.33 |
| 6,997,495 B1 * | 2/2006 | Groezinger | ................... | 296/26.15 |
| 7,794,001 B2 * | 9/2010 | Blackwell et al. | ................... | 296/24.38 |
| 7,874,107 B1 * | 1/2011 | Medley et al. | ................... | 52/79.5 |
| 7,882,659 B2 * | 2/2011 | Gyory et al. | ................... | 52/79.5 |
| 7,930,857 B2 * | 4/2011 | Pope | ................... | 52/79.5 |
| 8,112,943 B2 * | 2/2012 | Medley et al. | ................... | 52/79.5 |
| 8,347,560 B2 * | 1/2013 | Gyory et al. | ................... | 52/79.5 |
| 8,485,285 B2 * | 7/2013 | Ferrigni | ................... | 180/2.1 |
| 8,622,066 B2 * | 1/2014 | Dolsby et al. | ................... | 135/143 |
| 8,650,806 B1 * | 2/2014 | Condie | ................... | 52/79.5 |
| 8,720,125 B2 * | 5/2014 | Andretich | ................... | 52/79.5 |
| 2003/0188507 A1 * | 10/2003 | Cote, Jr. | ................... | 52/741.1 |
| 2005/0122014 A1 * | 6/2005 | Bucher et al. | ................... | 312/311 |
| 2007/0074463 A1 * | 4/2007 | Ziegelman | ................... | 52/79.1 |
| 2009/0266006 A1 * | 10/2009 | Gyory et al. | ................... | 52/79.5 |
| 2010/0186309 A1 * | 7/2010 | Hawkins | ................... | 52/79.5 |
| 2010/0269419 A1 * | 10/2010 | Gyory et al. | ................... | 52/79.5 |
| 2011/0047891 A1 * | 3/2011 | Andretich | ................... | 52/79.5 |
| 2011/0259768 A1 * | 10/2011 | Campbell et al. | ................... | 206/216 |
| 2013/0033057 A1 * | 2/2013 | Markham | ................... | 296/22 |
| 2013/0186010 A1 * | 7/2013 | Condie | ................... | 52/79.5 |

OTHER PUBLICATIONS

Article describing MUVBOX history, publicly available on Jun. 1, 2009 (4 pages).*

Three-page excerpt from Eat Out: Restaurant Design and Food Experiences, Robert Klanten (Editor), Sven Ehmann (Editor), Shonquis Moreno (Editor), Publisher: Gestalten Verlag (Mar. 1, 2010).*

Three-page excerpt from Interieurs Design Architecture une Culture, Dec. 2009.*

Two-page excerpt from Gaggenau new spaces 06, published on or around Sep. 2009.*

Three-page excerpt from Formes (V5, N4) published on or around Sep. 2009: MUVBOX L'Affaire Est Dans La Boite.*

Six-page article entitled "Hold the Mustard", Issue 784 of the publication NZ Retail, published by the New Zealand Retailers Association; http://www.retail.org.nz/downloads/Hold%20the%20mustard.pdf; Mar. 2012.*

Six-page article from Retail Design Blog published on Dec. 19, 2011; http://retaildesignblog.net/2011/12/19/snackbox-by-aedifica-muybox-new-york/.*

Two-page article published in Jul. 2012 by GSP (vol. 4, Issue 2 of Retail Insider); http://www.gspretail.com/newsletter/nl10_snacktime.html.*

* cited by examiner

MOBILE SERVICE STATION AND METHOD OF CONFIGURING THE SAME

This application is claims benefit of Serial No. 2,666,863, filed 25 May 2009 in Canada and which application is incorporated herein by reference. To the extent appropriate, a claim of priority is made to the above disclosed application.

FIELD OF THE INVENTION

The present invention relates to the field of mobile service stations. More particularly, the present invention relates to a mobile service station which can be used as a food stand, among other applications, as well as a method for configuring the service station.

BACKGROUND OF THE INVENTION

For a long time, there has been a need to provide various service stations at different events for short to long term periods of time. Very often, buildings have to be built on site which implies costs and problems due to coordination and installation of the building materials. Typically, when such service stations must be provided in remote locations or international expositions, participation in these types of activities is typically limited to companies with significant resources. Moreover, several markets in the world that could be of interest to different small and medium-sized companies are not typically considered by these companies given the complications and costs in attempting to provide international services at a foreign site for their products and services.

On the other hand, there is presently a worldwide surplus of shipping containers accumulating in various areas of the world. These building containers can be recycled for various applications.

U.S. Pat. No. 3,182,424 describes a combination shipping container and showcase serving multiple functions. The container not only houses trail exhibits but is also used as a means for transporting the exhibits to various sites. The container can be shipped to port cities which do not necessarily have business centers and then moved in land by truck or rail transportation means to the appropriate display location.

U.S. Pat. No. 5,493,817 describes a mobile workshop. This mobile workshop has the capacity to be transported as a closed container to different work sites. Various machinery items are mounted on the side walls of the container. The side walls of the container are retractable from a vertical position, acting as container walls to a horizontal position, defining a new base for the workshop when deployed.

However, there is still presently a need for a mobile service station that is adaptable for use as a high-end food stand, wherein the side walls can act as a surface area for consumers using the service station services in vicinity of the station.

SUMMARY OF THE INVENTION

An object of the present invention is to propose a new mobile service station that satisfies at least one of the above-mentioned needs.

According to the present invention, there is provided a mobile service station, comprising:
 a deployable structure configurable between a first closed configuration wherein the structure is a container having two side walls, a roof, a floor, a front wall and a rear wall, and a second deployed configuration as an operating service station;
 service station accessories mounted on at least one of the side walls;
 wherein at least one side wall of the structure is foldable between a first vertical position, wherein the at least one side wall acts as a vertical side wall for the closed configuration, and a second position wherein the side wall acts as additional floor space for the structure in the deployed configuration.

Preferably, the structure is based on a previously used shipping container that has been recycled for the present application.

Preferably, the mobile service station is operated as a food stand.

According to the present invention, there is also provided a method of providing a mobile service station and configuring the service station, comprising the following steps:
 a) providing a mobile service station comprising:
  a deployable structure configurable between a first closed configuration wherein the structure is a container having two side walls, a roof, a floor, a front wall and a rear wall, and a second deployed configuration as an operating service station;
  service station accessories mounted on at least one of the side walls;
  wherein at least one side wall of the structure is foldable between a first vertical position, wherein the side wall acts as a vertical side wall in the closed configuration, and a second position wherein the side wall acts as additional floor space for the structure in the deployed configuration;
 b) mounting service station accessories on the interior of at least one side wall of the structure;
 c) configuring the structure as a transport container;
 d) transporting the transport container to an installation location;
 e) lowering at least one of the side walls of the structure from a substantial vertical position to a horizontal position such that the side wall defines an additional floor space upon which users of the service station may stand.

The mobile service station according to the present invention offers several advantages:
 The shipping container structure at the base of the system is designed to carry heavy loads and can resist to harsh environments. The service station can be transported globally on boats or transported on roads or by rail.
 The shipping containers are made to standard measurements, which simplifies design and planning for transport.
 Containers are often available at a cost as lower compared to finish structures built by labour-intensive means (including building material such as bricks and mortar, which also require expensive foundations).
 Shipping containers recycled in this manner also represent a good example of sustainable development.

A non-restrictive description of a preferred embodiment of the invention will now be given with reference to the appended drawings.

BRIEF DESCRIPTION OF THE DRAWINGS

FIGS. 9A to 11F are assembly drawings of components for the motor controlling and actuating the sidewall deployment mechanism.

DESCRIPTION OF A PREFERRED EMBODIMENT

Figure 1:
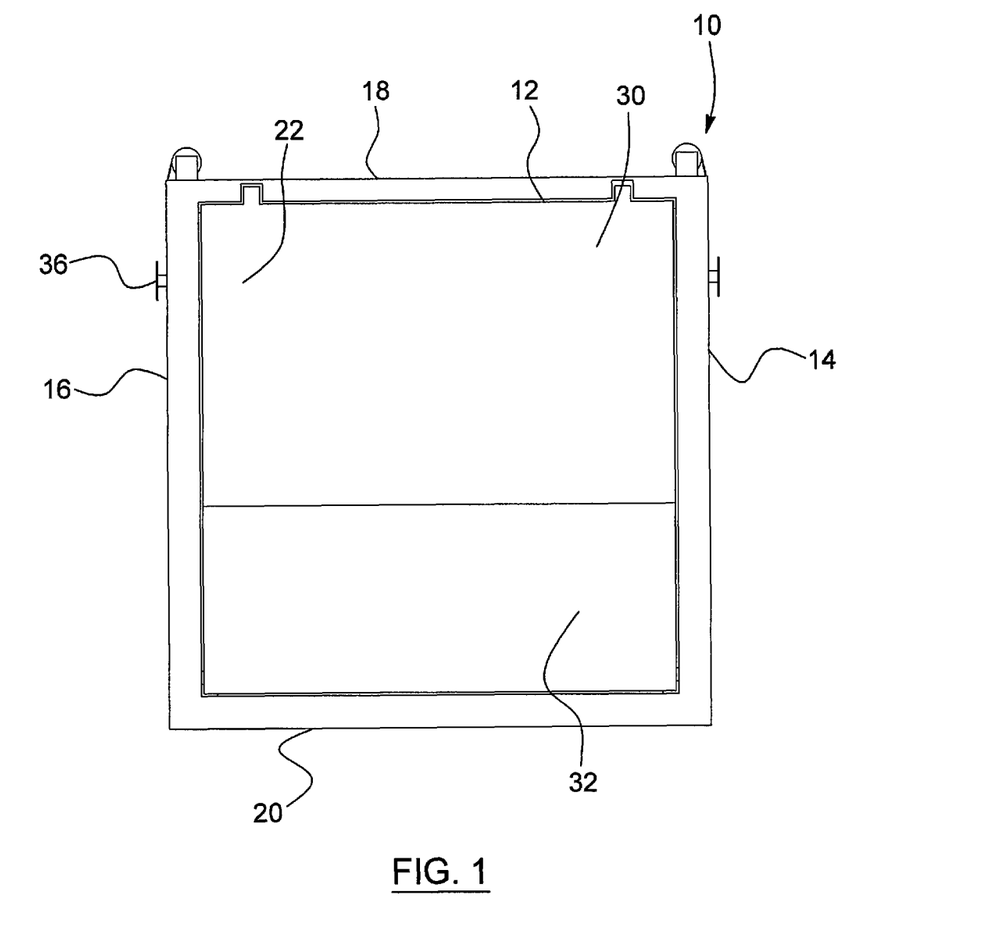
FIG. 1 is a front view of a mobile service station in accordance with a preferred embodiment of the present invention, in a closed configuration.

According to the present invention, a mobile service station is shown in FIG. 1.

Figure 2:
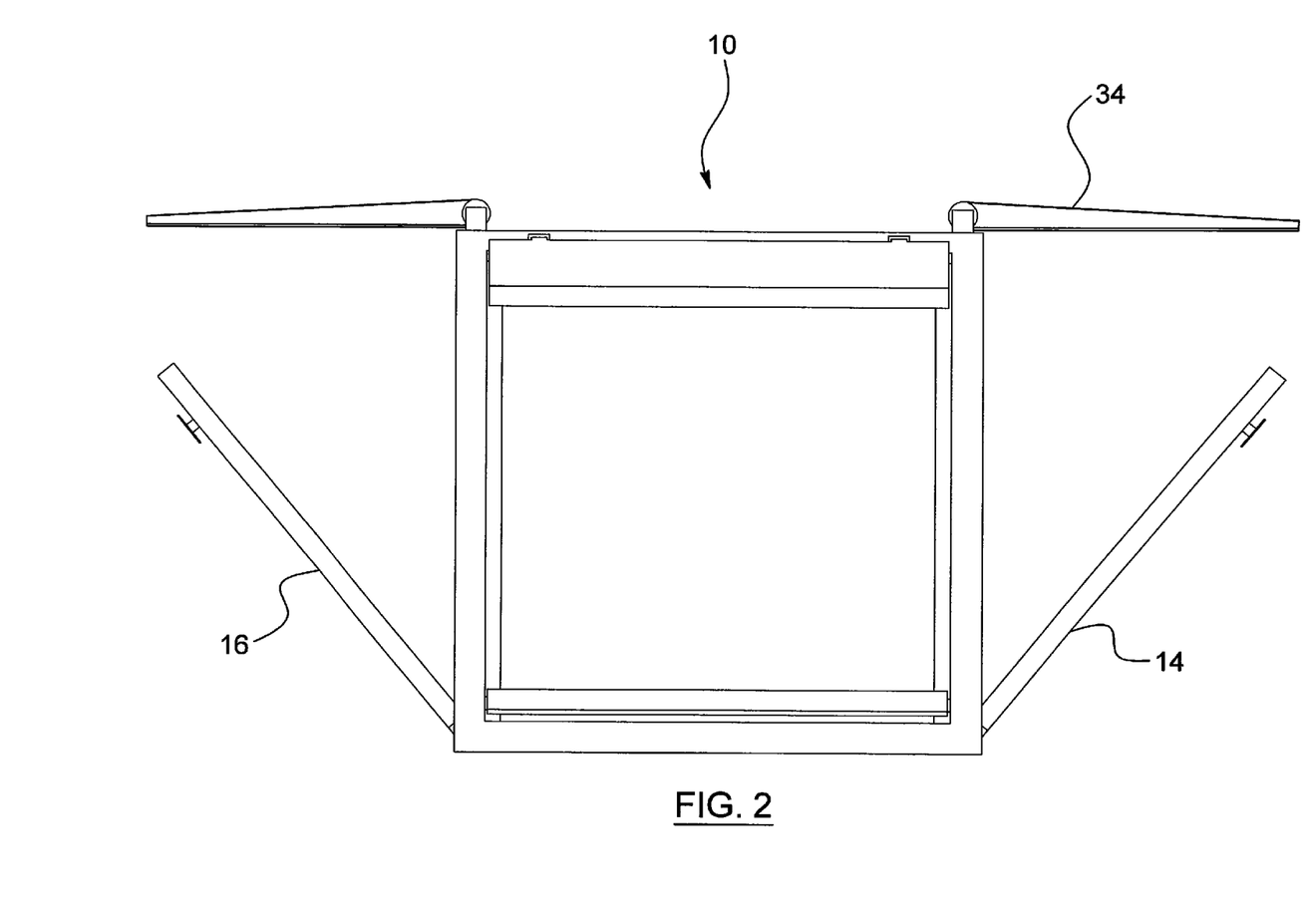
FIG. 2 is a front view of the mobile service station shown in FIG. 1 with the side walls opening and a canopy deploying.
Figure 3:
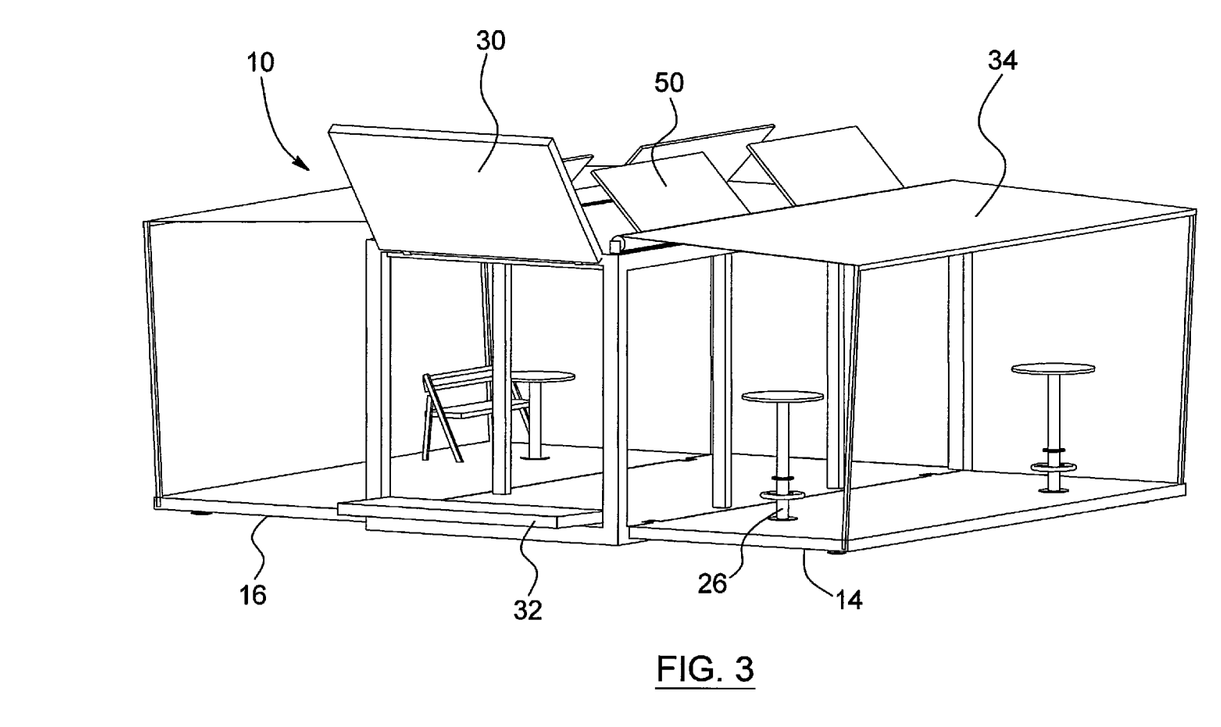
FIG. 3 is a perspective view of a mobile service station in accordance with another preferred embodiment of the present invention, in a deployed configuration.
Figure 4:
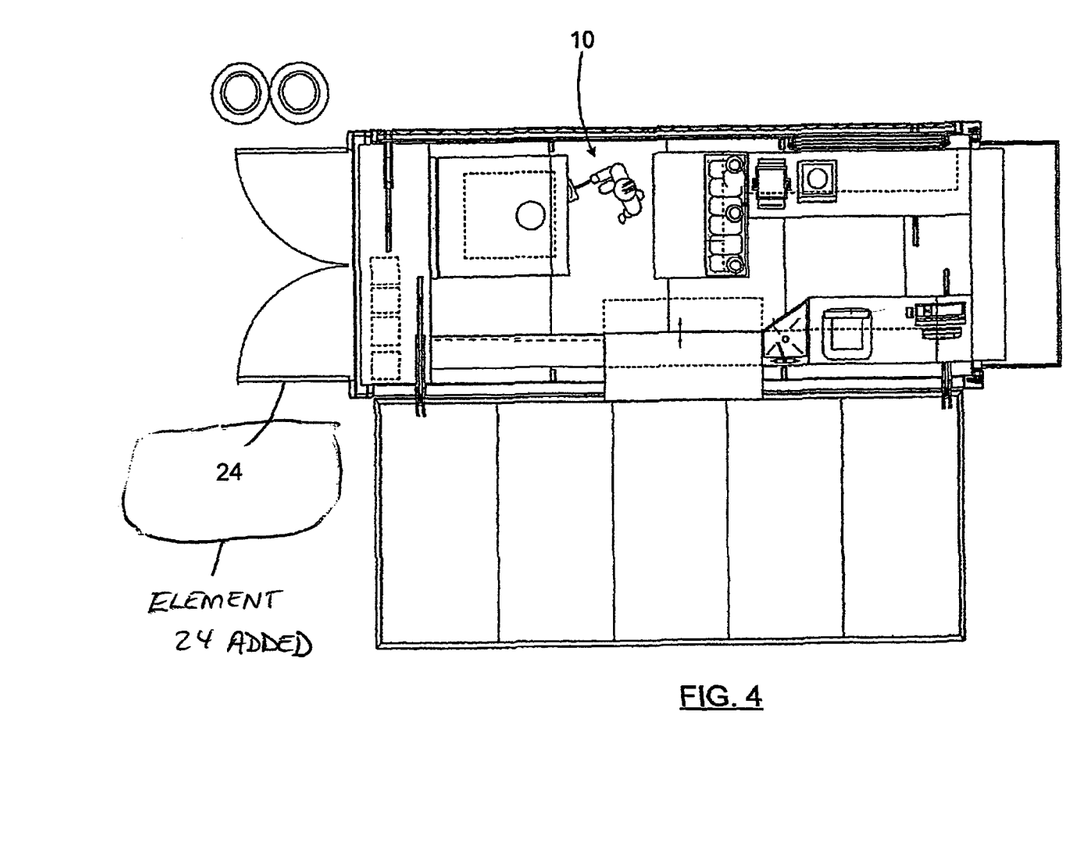
FIG. 4 is top view of floor space allocation for the mobile service station shown in FIG. 3.
Figure 5A:
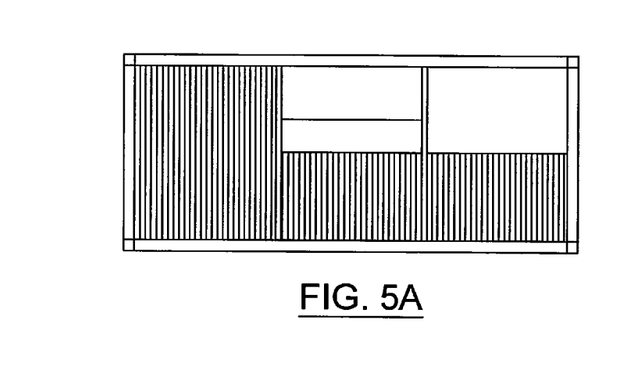
FIGS. 5A to 5C are two side views and one front view respectively of the mobile service station shown in FIG. 3 in an open configuration.
Figure 5B:
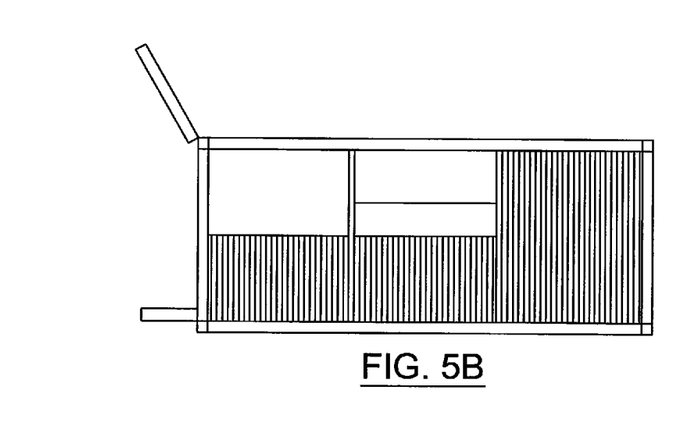
Figure 5C:
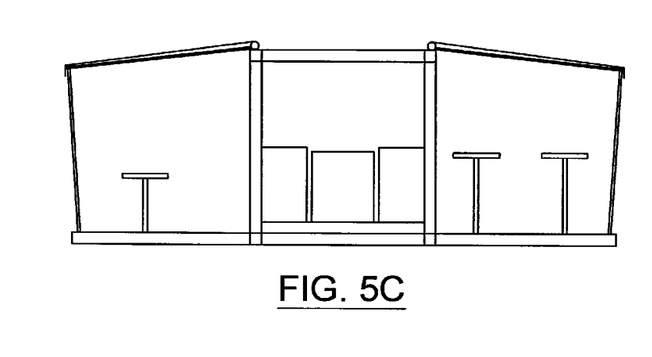
Figure 6A:
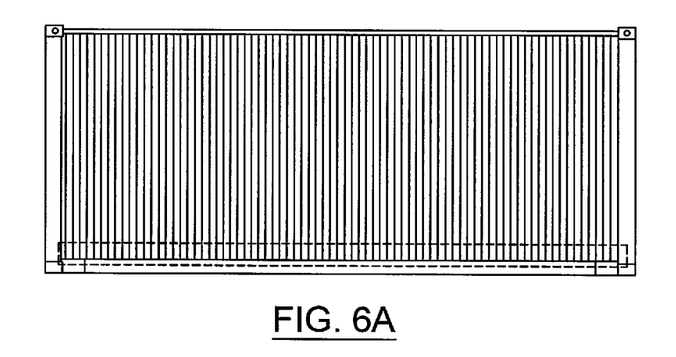
FIGS. 6A to 6C include side and front views of the mobile service station shown in FIG. 3 in a closed configuration.
Figure 6B:
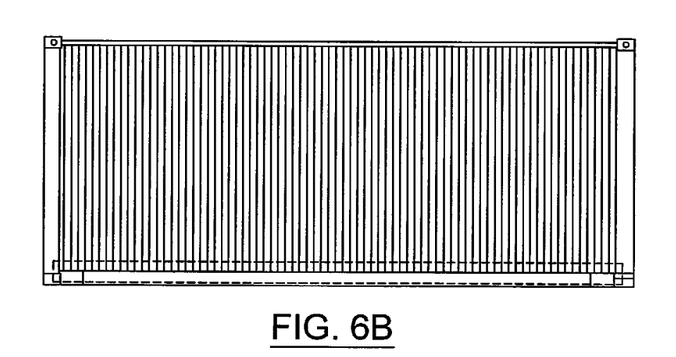
Figure 6C:
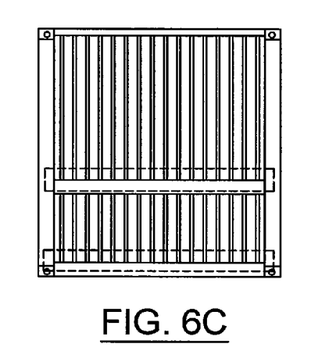
Figure 7:
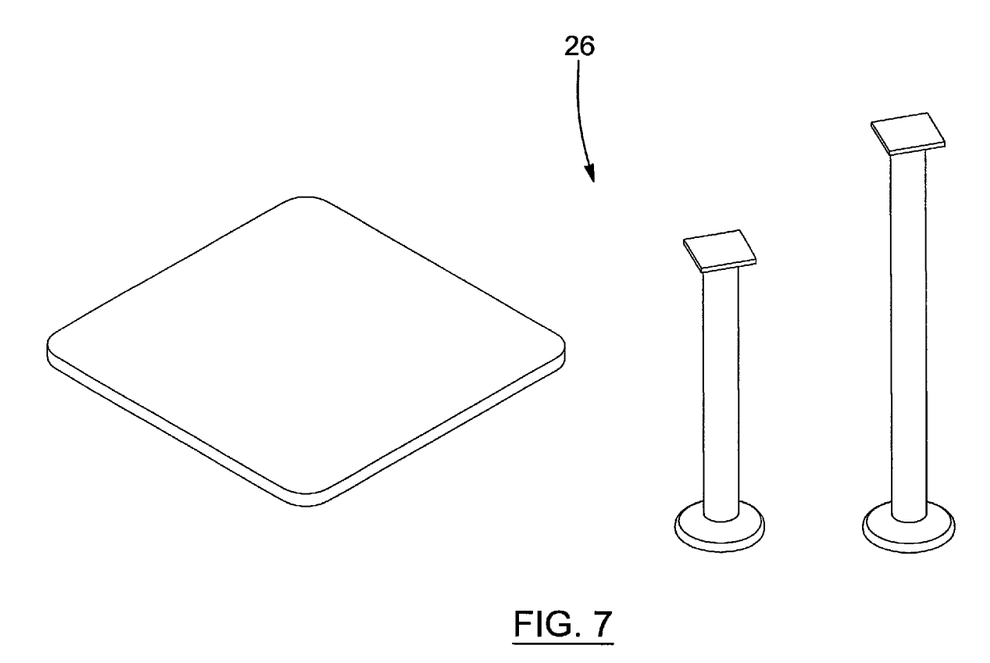
FIG. 7 is a perspective exploded view of table components to be installed on one of the side walls of the mobile service station shown in FIG. 1.
Figure 8:
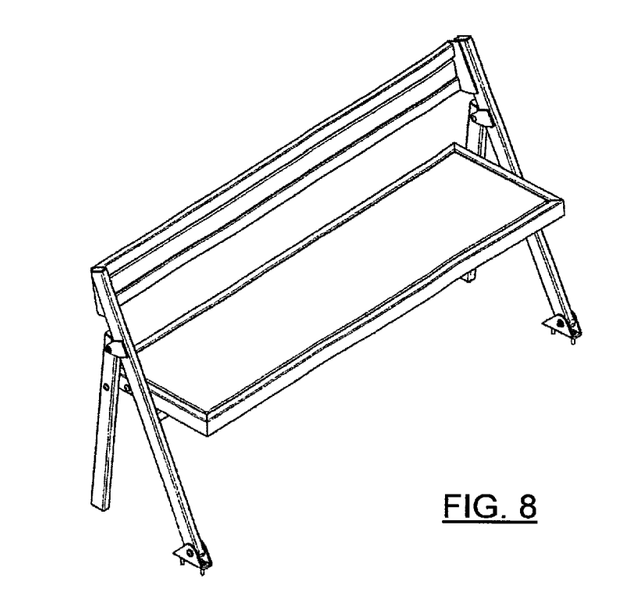
FIG. 8 is a perspective view of a bench to be installed on one of the side walls of the mobile service station shown in FIG. 1.
Figures 9A, 9B, 9D, 9E:
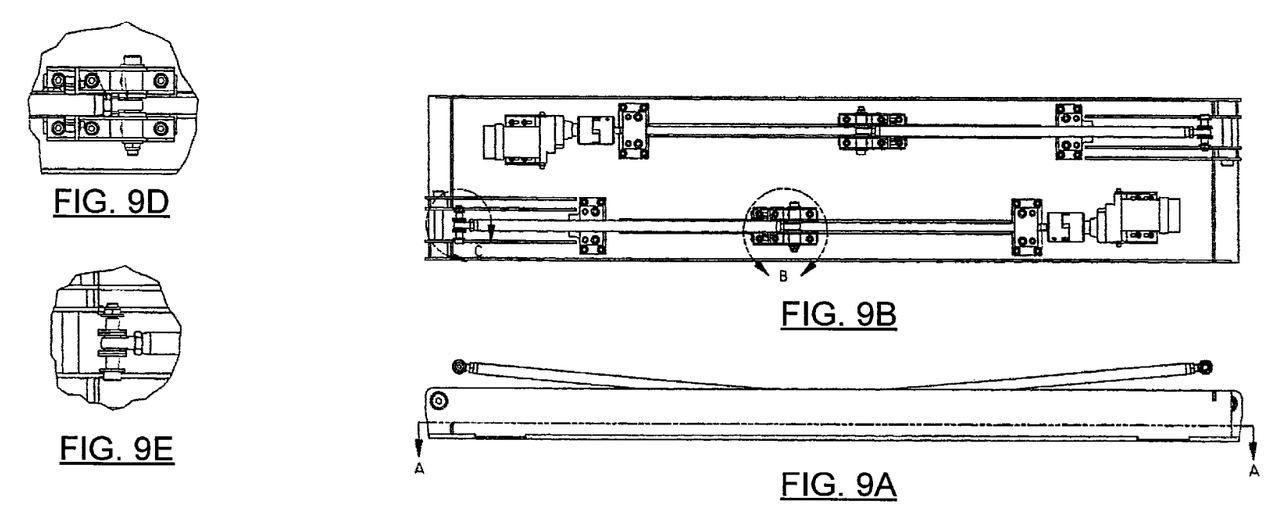
Figure 9C:
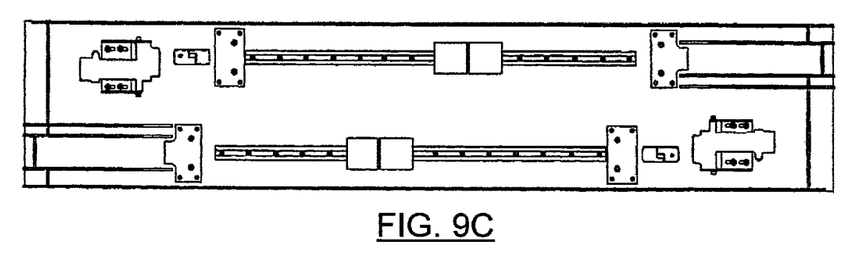
Figure 10A:
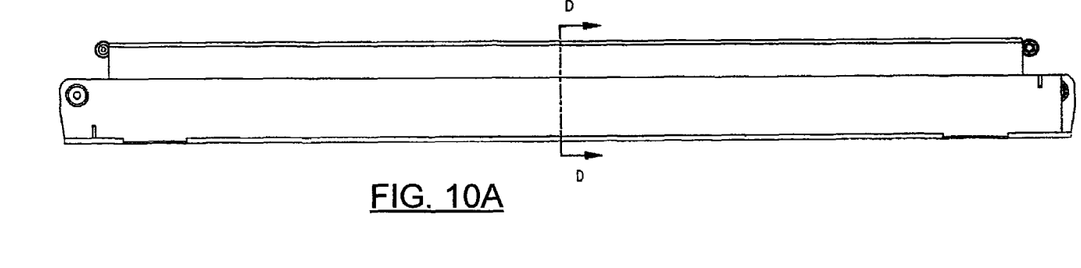
Figure 10B:
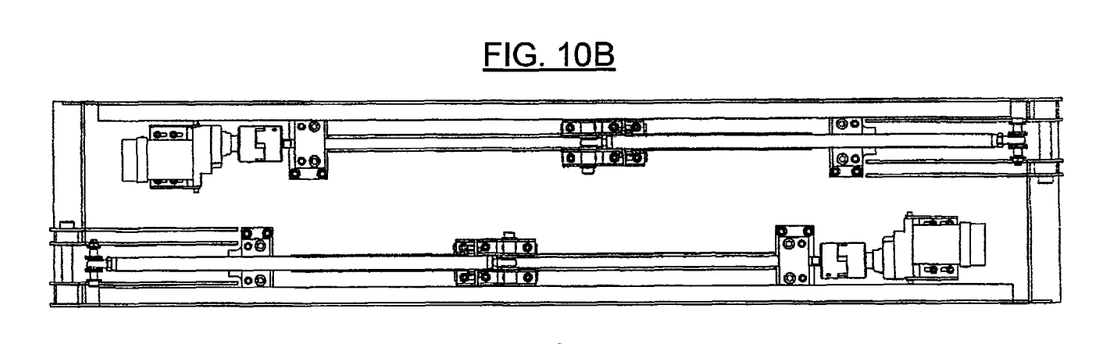
Figure 10C:
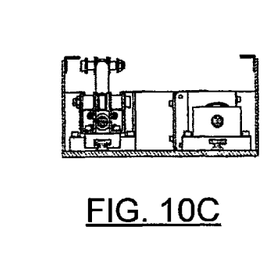
Figure 11A:
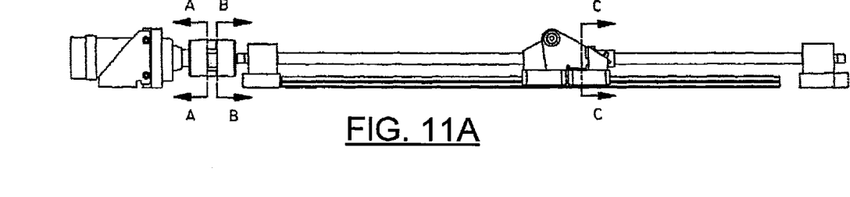
Figure 11B:
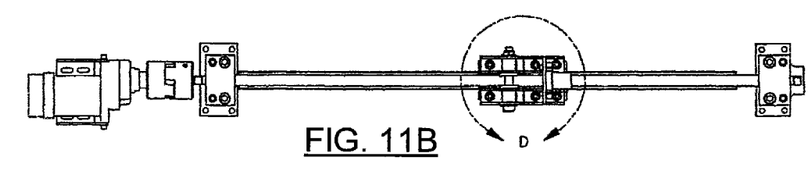
Figures 11C, 11D:
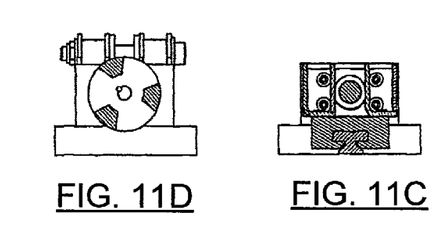
Figure 11E:
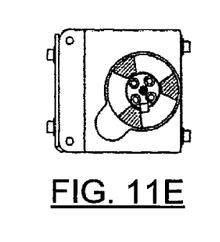
Figure 11F:
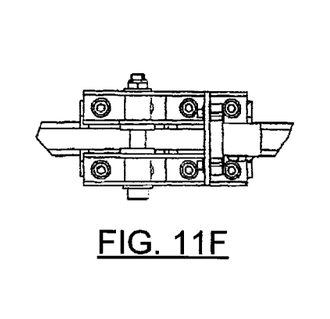

The mobile service station 10 comprises a deployable structure 12 configurable between a first closed configuration (shown for example in FIG. 1) and a second deployed configuration (shown in FIG. 3). In the closed configuration, the structure is a container having two side walls 14, 16, a roof 18, a floor 20, a front wall 22 and a rear wall 24. In the second deployed configuration, the station can be used as an operating service station. The station includes service station accessories 26 mounted on at least one of the side walls 14, 16. The side walls of the structure are foldable between a first vertical position (shown in FIG. 1), wherein the side walls act as vertical side walls for the closed configuration, and a second position wherein the side wall acts as additional floor space for the structure in the deployed configuration (as shown in FIG. 3). FIG. 2 illustrates the deployment sequence between the closed and deployed configurations.

Preferably, the structure is based on a previously used shipping container that has been recycled for the present application.

Preferably, the mobile service station is operated as a food stand.

Preferably, as shown in FIGS. 2 to 5, the front wall has separable and deployable top and bottom portions 30,32.

Preferably, as shown in FIGS. 2 and 3, the mobile service station also includes a deployable canopy 34 that is deployed at the same time as the side walls.

According to the present invention, there is also provided a method of providing a mobile service station and configuring the service station, comprising the following steps:

a) providing a mobile service station comprising:
 a deployable structure configurable between a first closed configuration wherein the structure is a container having two side walls, a roof, a floor, a front wall and a rear wall, and a second deployed configuration as an operating service station;
 service station accessories mounted on at least one of the side walls;
 wherein at least one side wall of the structure is foldable between a first vertical position, wherein the side wall acts as a vertical side wall in the closed configuration, and a second position wherein the side wall acts as additional floor space for the structure in the deployed configuration;

b) mounting service station accessories on the interior of at least one side wall of the structure;

c) configuring the structure as a transport container;

d) transporting the transport container to an installation location;

e) lowering at least one of the side walls of the structure from a substantial vertical position to a horizontal position such that the side wall defines an additional floor space upon which users of the service station may stand.

The mobile service station due to its transport container aspect is easily transportable to remote sites for installation and use. Although the service station illustrated in the preferred embodiment is used as a high-end food stand, other types of services may be provided using such a mobile service station with expanded floor space and associated accessories.

Preferably, as shown in FIG. 1, the mobile service station further comprises an adjustment system 36 for adjusting a level of the side walls when the service station is in a deployed configuration.

As better shown in FIG. 3, preferably, the mobile service station further comprises solar panels 50 positioned on the roof of the service station for powering devices positioned with the station.

FIGS. 9A to 11F are assembly drawings showing an example of a deployment mechanism that can be used to deploy the side walls 14, 16.

Although the present invention has been explained hereinabove by way of a preferred embodiment thereof, it should be understood that the invention is not limited to this precise embodiment and that various changes and modifications may be effected therein without departing from the scope or spirit of the invention.

The invention claimed is:

1. A mobile service station, comprising:
 a deployable structure configurable between a first closed configuration wherein the structure is a container having two side walls, a roof, a floor, a front wall and a rear wall, and a second deployed configuration as an operating service station;
 service station accessories mounted on at least one of the side walls;
 a deployable flexible canopy simultaneously deployable with an opening of the side walls; and
 at least one solar panel positioned on the roof of the service station for powering devices positioned in the service station;
 wherein at least one side wall of the structure is foldable between a first vertical position, wherein the at least one side wall acts as a vertical side wall for the closed configuration, and a second position wherein the at least one side wall acts as additional floor space for the structure in the deployed configuration, wherein at least one of the side, front and rear walls comprises deployable non-overlapping top and bottom portions, the top and bottom portions being pivotably connected to top and bottom sections of the container and each comprising an outer edge, wherein the top portion is sized to cover a first fraction of the corresponding at least one of the side, front and rear walls in the closed configuration, the bottom portion is sized to cover a remaining complementary fraction of the corresponding at least one of the side, front and rear walls in the closed configuration, wherein the top portion is greater in size than the bottom portion and wherein the outer edges of the top and bottom portions adjacently meet in the closed configuration.

2. The mobile service station according to claim 1, wherein at least one of the accessories is a deployable bench with a back portion pivotably and fixedly connected to the at least one of the side walls.

3. The mobile service station according to claim 1, wherein one of the accessories is a table having a base removably and screwably installable on the at least one of the side walls.

4. A method for providing a mobile service station and configuring the service station, comprising the following steps:
   a) providing a mobile service station comprising:
      a deployable structure configurable between a first closed configuration wherein the structure is a container having two side walls, a roof, a floor, a front wall and a rear wall, and a second deployed configuration as an operating service station;
      service station accessories mounted on at least one of the side walls;
      a deployable flexible canopy simultaneously deployable with an opening of the side walls; and
      at least one solar panel positioned on the roof of the service station for powering devices positioned in the service station;
      wherein at least one side wall of the structure is foldable between a first vertical position, wherein the side wall acts as a vertical side wall in the closed configuration, and a second position wherein the side wall acts as additional floor space for the structure in the deployed configuration, wherein at least one of the side, front and rear walls comprises non-overlapping complementarily sized deployable top and bottom portions, the top and bottom portions being pivotably connected to top and bottom sections of the container and each comprising an outer edge, wherein the top portion is sized to cover a first fraction of the corresponding at least one of the side, front and rear walls in the closed configuration, the bottom portion is sized to cover a remaining complementary fraction of the corresponding at least one of the side, front and rear walls in the closed configuration, wherein the top portion is greater than the bottom portion and wherein the outer edges of the top and bottom portions adjacently meet in the closed configuration;
   b) mounting service station accessories on the interior of at least one side wall of the structure;
   c) configuring the structure as a transport container;
   d) transporting the transport container to an installation location;
   e) lowering at least one of the side walls of the structure from a substantial vertical position to a horizontal position such that the at least one side wall defines an additional floor space upon which users of the service station may stand.

* * * * *